(12) United States Patent
Mathur et al.

(10) Patent No.: US 7,987,341 B2
(45) Date of Patent: Jul. 26, 2011

(54) COMPUTING MACHINE USING SOFTWARE OBJECTS FOR TRANSFERRING DATA THAT INCLUDES NO DESTINATION INFORMATION

(75) Inventors: Chandan Mathur, Manassas, VA (US); Scott Hellenbach, Amissville, VA (US); John W. Rapp, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 721 days.

(21) Appl. No.: 10/684,053

(22) Filed: Oct. 9, 2003

(65) Prior Publication Data

US 2004/0181621 A1    Sep. 16, 2004

Related U.S. Application Data

(60) Provisional application No. 60/422,503, filed on Oct. 31, 2002.

(51) Int. Cl.
  *G06F 9/00* (2006.01)
  *G06F 15/76* (2006.01)
  *G06F 3/00* (2006.01)
(52) U.S. Cl. ............................................. 712/34; 710/52
(58) Field of Classification Search .................... 712/29, 712/34, 35, 38, 225; 710/33, 52; 709/213
    See application file for complete search history.

(56) References Cited

U.S. PATENT DOCUMENTS

| 3,665,173 | A | | 5/1972 | Bouricius et al. |
| 4,703,475 | A | * | 10/1987 | Dretzka et al. ................. 370/394 |
| 4,774,574 | A | | 9/1988 | Daly et al. |
| 4,782,461 | A | | 11/1988 | Mick et al. |
| 4,862,407 | A | | 8/1989 | Fette et al. |
| 4,873,626 | A | | 10/1989 | Gifford |
| 4,914,653 | A | | 4/1990 | Bishop et al. |

(Continued)

FOREIGN PATENT DOCUMENTS

AU    2003287317    6/2004

(Continued)

OTHER PUBLICATIONS

Microsoft, "Microsoft Computer Dictionary, 4th Edition," Microsoft Press, 1999, p. 215.*

(Continued)

*Primary Examiner* — David J Huisman
(74) *Attorney, Agent, or Firm* — Dylan O. Adams; Graybeal Jackson LLP

(57) ABSTRACT

A computing machine includes a first buffer and a processor coupled to the buffer. The processor executes an application, a first data-transfer object, and a second data-transfer object, publishes data under the control of the application, loads the published data into the buffer under the control of the first data-transfer object, and retrieves the published data from the buffer under the control of the second data-transfer object. Alternatively, the processor retrieves data and loads the retrieved data into the buffer under the control of the first data-transfer object, unloads the data from the buffer under the control of the second data-transfer object, and processes the unloaded data under the control of the application. Where the computing machine is a peer-vector machine that includes a hardwired pipeline accelerator coupled to the processor, the buffer and data-transfer objects facilitate the transfer of data between the application and the accelerator.

11 Claims, 7 Drawing Sheets

U.S. PATENT DOCUMENTS

| | | | |
|---|---|---|---|
| 4,956,771 A | 9/1990 | Neustaedter | |
| 4,985,832 A | 1/1991 | Grondalski | |
| 5,185,871 A | 2/1993 | Frey et al. | |
| 5,283,883 A * | 2/1994 | Mishler | 710/33 |
| 5,317,752 A | 5/1994 | Jewett et al. | |
| 5,339,413 A | 8/1994 | Koval et al. | |
| 5,361,373 A * | 11/1994 | Gilson | 712/1 |
| 5,371,896 A | 12/1994 | Gove et al. | |
| 5,377,333 A * | 12/1994 | Nakagoshi et al. | 710/317 |
| 5,421,028 A | 5/1995 | Swanson | |
| 5,440,682 A | 8/1995 | Deering | |
| 5,524,075 A | 6/1996 | Rousseau et al. | |
| 5,544,067 A | 8/1996 | Rostoker et al. | |
| 5,583,964 A | 12/1996 | Wang | |
| 5,623,418 A | 4/1997 | Rostoker et al. | |
| 5,640,107 A | 6/1997 | Kruse | |
| 5,648,732 A | 7/1997 | Duncan | |
| 5,649,135 A | 7/1997 | Pechanek et al. | |
| 5,655,069 A | 8/1997 | Ogawara et al. | |
| 5,694,371 A | 12/1997 | Kawaguchi | |
| 5,710,910 A | 1/1998 | Kehl et al. | |
| 5,712,922 A | 1/1998 | Loewenthal et al. | |
| 5,732,107 A | 3/1998 | Phillips et al. | |
| 5,752,071 A | 5/1998 | Tubbs et al. | |
| 5,784,636 A | 7/1998 | Rupp | |
| 5,801,958 A | 9/1998 | Dangelo et al. | |
| 5,867,399 A | 2/1999 | Rostoker et al. | |
| 5,892,962 A | 4/1999 | Cloutier et al. | |
| 5,909,565 A * | 6/1999 | Morikawa et al. | 712/200 |
| 5,910,897 A | 6/1999 | Dangelo et al. | |
| 5,916,307 A | 6/1999 | Piskiel et al. | |
| 5,930,147 A | 7/1999 | Takei | |
| 5,931,959 A | 8/1999 | Kwiat | |
| 5,933,356 A | 8/1999 | Rostoker et al. | |
| 5,941,999 A | 8/1999 | Matena et al. | |
| 5,963,454 A | 10/1999 | Dockser et al. | |
| 5,978,578 A | 11/1999 | Azarya et al. | |
| 5,987,620 A | 11/1999 | Tran | |
| 5,996,059 A | 11/1999 | Porten et al. | |
| 6,009,531 A | 12/1999 | Selvidge et al. | |
| 6,018,793 A | 1/2000 | Rao | |
| 6,023,742 A | 2/2000 | Ebeling et al. | |
| 6,028,939 A | 2/2000 | Yin | |
| 6,049,222 A | 4/2000 | Lawman | |
| 6,096,091 A | 8/2000 | Hartmann | |
| 6,108,693 A * | 8/2000 | Tamura | 709/213 |
| 6,112,288 A | 8/2000 | Ullner | |
| 6,115,047 A | 9/2000 | Deering | |
| 6,128,755 A | 10/2000 | Bello et al. | |
| 6,192,384 B1 | 2/2001 | Dally et al. | |
| 6,202,139 B1 | 3/2001 | Witt et al. | |
| 6,205,516 B1 | 3/2001 | Usami | |
| 6,216,191 B1 * | 4/2001 | Britton et al. | 710/305 |
| 6,216,252 B1 | 4/2001 | Dangelo et al. | |
| 6,237,054 B1 | 5/2001 | Freitag, Jr. | |
| 6,247,118 B1 | 6/2001 | Zumkehr et al. | |
| 6,247,134 B1 | 6/2001 | Sproch et al. | |
| 6,253,276 B1 | 6/2001 | Jeddeloh | |
| 6,282,578 B1 | 8/2001 | Aizono et al. | |
| 6,282,627 B1 | 8/2001 | Wong et al. | |
| 6,308,311 B1 | 10/2001 | Carmichael et al. | |
| 6,324,678 B1 | 11/2001 | Dangelo et al. | |
| 6,326,806 B1 | 12/2001 | Fallside et al. | |
| 6,363,465 B1 | 3/2002 | Toda | |
| 6,405,266 B1 * | 6/2002 | Bass et al. | 719/328 |
| 6,470,482 B1 | 10/2002 | Rostoker et al. | |
| 6,477,170 B1 | 11/2002 | Lu et al. | |
| 6,516,420 B1 | 2/2003 | Audityan et al. | |
| 6,526,430 B1 | 2/2003 | Hung et al. | |
| 6,532,009 B1 | 3/2003 | Fox et al. | |
| 6,611,920 B1 | 8/2003 | Fletcher et al. | |
| 8,606,360 | 8/2003 | Dunning et al. | |
| 6,624,819 B1 | 9/2003 | Lewis | |
| 6,625,749 B1 | 9/2003 | Quach | |
| 6,662,285 B1 | 12/2003 | Sastry et al. | |
| 6,684,314 B1 | 1/2004 | Manter | |
| 6,704,816 B1 | 3/2004 | Burke | |
| 6,708,239 B1 | 3/2004 | Ellerbrock et al. | |
| 6,769,072 B1 | 7/2004 | Kawamura et al. | |
| 6,785,841 B2 | 8/2004 | Akrout et al. | |
| 6,785,842 B2 | 8/2004 | Zumkehr et al. | |
| 6,829,697 B1 | 12/2004 | Davis et al. | |
| 6,839,873 B1 | 1/2005 | Moore | |
| 6,915,502 B2 | 7/2005 | Schott et al. | |
| 6,925,549 B2 | 8/2005 | Cook et al. | |
| 6,982,976 B2 | 1/2006 | Galicki et al. | |
| 6,985,975 B1 * | 1/2006 | Chamdani et al. | 710/55 |
| 7,000,213 B2 | 2/2006 | Banerjee et al. | |
| 7,024,654 B2 | 4/2006 | Bersch et al. | |
| 7,036,059 B1 | 4/2006 | Carmichael et al. | |
| 7,073,158 B2 | 7/2006 | McCubbrey | |
| 7,117,390 B1 | 10/2006 | Klarer et al. | |
| 7,134,047 B2 | 11/2006 | Quach | |
| 7,137,020 B2 | 11/2006 | Gilstrap et al. | |
| 7,143,302 B2 | 11/2006 | Pappalardo et al. | |
| 7,143,418 B1 | 11/2006 | Patterson | |
| 7,177,310 B2 | 2/2007 | Inagaki et al. | |
| 7,228,520 B1 | 6/2007 | Keller et al. | |
| 7,260,794 B2 | 8/2007 | Butts | |
| 7,284,225 B1 | 10/2007 | Ballagh et al. | |
| 7,373,432 B2 | 5/2008 | Rapp et al. | |
| 7,386,704 B2 | 6/2008 | Schulz et al. | |
| 7,404,170 B2 | 7/2008 | Schott et al. | |
| 7,418,574 B2 | 8/2008 | Mathur et al. | |
| 7,487,302 B2 | 2/2009 | Gouldey et al. | |
| 2001/0014937 A1 | 8/2001 | Huppenthal et al. | |
| 2001/0025338 A1 | 9/2001 | Zumkehr et al. | |
| 2001/0047509 A1 | 11/2001 | Mason et al. | |
| 2002/0018470 A1 | 2/2002 | Galicki et al. | |
| 2002/0041685 A1 | 4/2002 | McLoone et al. | |
| 2002/0066910 A1 | 6/2002 | Tamemoto et al. | |
| 2002/0087829 A1 | 7/2002 | Snyder et al. | |
| 2002/0112091 A1 | 8/2002 | Schott et al. | |
| 2002/0120883 A1 | 8/2002 | Cook et al. | |
| 2002/0144175 A1 | 10/2002 | Long et al. | |
| 2002/0162086 A1 | 10/2002 | Morgan | |
| 2003/0009651 A1 | 1/2003 | Najam et al. | |
| 2003/0014627 A1 | 1/2003 | Krishna et al. | |
| 2003/0061409 A1 | 3/2003 | RuDusky | |
| 2003/0115500 A1 | 6/2003 | Akrout et al. | |
| 2003/0177223 A1 | 9/2003 | Erickson | |
| 2003/0229877 A1 | 12/2003 | Bersch et al. | |
| 2003/0231649 A1 | 12/2003 | Awoseyi et al. | |
| 2004/0019771 A1 | 1/2004 | Quach | |
| 2004/0019883 A1 | 1/2004 | Banerjee et al. | |
| 2004/0044915 A1 | 3/2004 | Bose et al. | |
| 2004/0045015 A1 | 3/2004 | Haji-Aghajani et al. | |
| 2004/0061147 A1 | 4/2004 | Fujita et al. | |
| 2004/0064198 A1 | 4/2004 | Reynolds et al. | |
| 2004/0123258 A1 | 6/2004 | Butts | |
| 2004/0130927 A1 | 7/2004 | Schulz et al. | |
| 2004/0133763 A1 | 7/2004 | Mathur et al. | |
| 2004/0136241 A1 | 7/2004 | Rapp et al. | |
| 2004/0153752 A1 | 8/2004 | Sutardja et al. | |
| 2004/0170070 A1 | 9/2004 | Rapp et al. | |
| 2004/0181621 A1 | 9/2004 | Mathur et al. | |
| 2005/0104743 A1 | 5/2005 | Ripolone et al. | |
| 2005/0149898 A1 | 7/2005 | Hakewill et al. | |
| 2006/0036774 A1 | 2/2006 | Schott et al. | |
| 2006/0085781 A1 | 4/2006 | Rapp et al. | |
| 2006/0087450 A1 | 4/2006 | Schulz et al. | |
| 2006/0101250 A1 | 5/2006 | Rapp et al. | |
| 2006/0101253 A1 | 5/2006 | Rapp et al. | |
| 2006/0101307 A1 | 5/2006 | Rapp et al. | |
| 2006/0123282 A1 | 6/2006 | Gouldey et al. | |
| 2006/0149920 A1 | 7/2006 | Rapp et al. | |
| 2006/0206850 A1 | 9/2006 | McCubbrey | |
| 2006/0230377 A1 | 10/2006 | Rapp et al. | |
| 2006/0236018 A1 | 10/2006 | Dao et al. | |
| 2007/0055907 A1 | 3/2007 | Sutardja et al. | |
| 2007/0271545 A1 | 11/2007 | Eng | |
| 2008/0222337 A1 | 9/2008 | Schulz et al. | |

FOREIGN PATENT DOCUMENTS

| | | |
|---|---|---|
| AU | 2003287318 | 6/2004 |
| AU | 2003287319 | 6/2004 |
| AU | 2003287320 | 6/2004 |

| | | |
|---|---|---|
| AU | 2003287321 | 6/2004 |
| CA | 2503611 | 5/2004 |
| CA | 2503613 | 5/2004 |
| CA | 2503617 | 5/2004 |
| CA | 2503620 | 5/2004 |
| CA | 2503622 | 5/2004 |
| EP | 0 694 847 A2 | 1/1996 |
| EP | 0 945 788 A2 | 9/1999 |
| EP | 1 061 438 A1 | 12/2000 |
| EP | 1 061 439 A1 | 12/2000 |
| EP | 0 945 788 A3 | 6/2002 |
| EP | 1559005 | 8/2005 |
| EP | 1570344 | 9/2005 |
| EP | 1573514 | 9/2005 |
| EP | 1573515 | 9/2005 |
| EP | 1576471 | 9/2005 |
| JP | 63-234343 | 9/1988 |
| JP | 5108347 | 4/1993 |
| JP | 6282432 | 10/1994 |
| JP | 09-097204 | 4/1997 |
| JP | 2001-236496 | 8/2001 |
| JP | 2002-132489 A | 5/2002 |
| JP | 2002-149424 | 5/2002 |
| JP | 2002149424 | 5/2002 |
| JP | 2002-269063 A | 9/2002 |
| JP | 2002-281079 A | 9/2002 |
| JP | 2006515941 | 6/2006 |
| JP | 2006518056 | 8/2006 |
| JP | 2006518057 | 8/2006 |
| JP | 2006518058 | 8/2006 |
| JP | 2006518495 | 8/2006 |
| KR | 20050084628 | 8/2005 |
| KR | 20050084629 | 8/2005 |
| KR | 20050086423 | 8/2005 |
| KR | 20050086424 | 8/2005 |
| KR | 20050088995 | 9/2005 |
| TW | 470914 | 1/2002 |
| TW | 497074 | 8/2002 |
| TW | 200416594 | 9/2004 |
| WO | 2004042560 | 5/2004 |
| WO | 2004042561 | 5/2004 |
| WO | 2004042562 | 5/2004 |
| WO | 2004042569 | 5/2004 |
| WO | 2004042574 | 5/2004 |
| WO | 2006039710 | 4/2006 |
| WO | 2006039711 | 4/2006 |
| WO | 2006039713 | 4/2006 |

OTHER PUBLICATIONS

Hansen, "The Acrrhitecture of Concurrent Programming," Prentice-Hall, Inc., 1977, pp. 16-17, 19-20, 24-27, 47-54, 72-73, and 151-152.*
Oki et al., "The Information Bus—An Architecture for Extensible Distributed Systems", 1993, pp. 58-68.*
Salcic Z et al., "FLIX environment for generation of custom-configurable machines in FPLDs for embedded applications", Microprocessors and Microsystems, IPC Business Press Ltd. London, GB, vol. 23, No. 8-9, Dec. 15, 1999, pp. 513-526.
International Search Report for PCT/US 03/34558, Jun. 16, 2005.
Lecurieux-Lafayette G: "Un Seul FPGA Dope Le Traitement D'Images", Electronique, CEP Communication, Paris, FR, No. 55, 1996, pp. 98, 101-103.
Vermeulen F. et al., "Flexible Hardware Acceleration for Multimedia Oriented Microprocessors", Micro-33. Proceedings of the 33$^{rd}$ Annual ACM/IEEE International Symposium on Microarchitecture. Monterey, CA, Dec. 10-13, 2000, Proceedings of the Annual ACM/IEEE International Symposium on Microarchitecture, Los Alamitos. CA: IEEE Comp. Soc, US, Dec. 10, 2000, pp. 171-177.
International Search Report for PCT/US 03/34557. Dec. 21, 2004.
International Search Report for PCT/US 03/34559, Jan. 7, 2005.
International Search Report for PCT/US2005/035818 dated Aug. 4, 2006.
Bakshi S; Gajski D D; "Partitioning and Pipelining for Performance-Constrained Hardware/Software Systems", IEEE Transactions on Very Large Scale Integration (VLSI) Systems, vol. 7, NR. 4, p. 419-432, (Dec. 1999), XP000869229.
Free Online Dictionary of Computing (1997) Definitions of "FPGA" and "raw data"; http://foldoc.org.
International Search Report for International Patent Application No. PCT/US2005/035813.
International Search Report for International Patent Application No. PCT/US2005/035814.
Microsoft (2002) Microsoft Computer Dictionary, 5$^{th}$ Edition; Microsoft Press; pp. 77-78.
Patterson (1996) Computer Architecture, A Quantitative Approach, 2$^{nd}$ Edition; Morgan Kauffman; pp. 134, 155.
"Chips: New Accelerator Chip From Hi/fn to Speed-Up Virtual Private Networks—"VPNs"—Product Announcement", EDGE Publishing, On & About AT&T, Oct. 26, 2008, http://findarticles.com/p/articles/mi_m0UNZ/is_1998_Oct_26/ai_53126574, 2 pages.
Lisa Wu, Chris Weaver, and Todd Austin, "CryptoManiac: A Fast Flexible Architecture for Secure Communication", IEEE 2001, 10 pages.
Examination Report, based on European Application No. 03781552.9 (EP1570344), European Patent Office, Sep. 6, 2005, 4 pages.
Examination Report, based on European Application No. 03781553.7 (EP1573515), European Patent Office, Jan. 12, 2007, 6 pages.
Final Office Action for U.S. Appl. No. 10/684,057, mailed Apr. 19, 2006.
IEEE VHDL Math Package Study Group: "Package_Math Real Version 0.7 9header only)" May 28, 1993, XP002372288 URL http://tams-www.informatik.uni-hamburg.de/vhdl/packages/P1076.2/mathpack.vhd>.
International Search Report based on International Application No. PCTUS2003034555, European Patent Office, Dec. 23, 2005, 8 pages.
International Search Report based on International Application No. PCTUS2003034556, European Patent Office, Mar. 7, 2006, 4 pages.
First Examination Report based on Taiwan Application Serial No. 092130031, dated May 13, 2009, 23 pages (TW language and English translation submitted herewith).
Office Action for U.S. Appl. No. 10/684,057, mailed Nov. 14, 2005.
Office Action for U.S. Appl. No. 10/684,057, mailed Aug. 7, 2007.
Office Action for U.S. Appl. No. 10/683,932, mailed Feb. 13, 2006.
Office Action for U.S. Appl. No. 10/683,932, mailed Oct. 9, 2007.
Srinivas Ramanathan and P. Venkat Rangan (1993) "Adaptive Feedback Techniques For Synchronized Multimedia Retrieval Over Integrated Networks"; IEEE/ACM Transactions on Networking, vol. 1, No. 2, pp. 246-260.
European Search Report for Application Serial No. EP95305073 (EP0694847), European Patent Office, Jun. 14, 1999.
Venkat Rangan P., Harrick M. Vin, and Srinivas Ramanathan (1992) "Designing an On-Demand Multimedia Service"; IEEE Communications Magazine, vol. 30, No. 7, Jul. 1992, pp. 56-65.
Harrick M. Vin and Venkat Rangan P., (1992) "System Support for Computer Mediated Multimedia Collaborations"; Sharing Perspectives, Toronto, Oct. 31-Nov. 4, 1992; pp. 203-209.
Examination Report, based on European Application No. 03781550.3 (EP1573514), European Patent Office, Aug. 31, 2007, pp. 5.
Andrew S. Tanenbaum, "Structured Computer Organization" 2nd Edition, 1984, pp. 10-12.
Rhett Davis: "MatLAB to RTL Synthesis" Nov. 16, 1998, XP002372287 Internet Archive, URL http://web.archive.org/web/20010702232849/http://bwrc.eecs.berkeley.edu/People/Grad_Students/wrdavis/research/ee244/progress.html>.
Todd Greanier. Serialization API, Jul. 2000, [online], [retrieved on Jun. 18, 2009]. Retrieved from the Internet , <java.sun.com/developer/technicalArticles/Programming/serialization/>, pp. 1-7 as printed.
Ann Wollrath, Roger Riggs, and Jim Waldo, "A Distributed Object Model for the Java System", Jun. 1996, [online], [retrieved on Jun. 18, 2009]. Retrieved from the Internet <usenix.org/publications/library/proceedings/coots96/wollrath.html>, pp. 1-14 as printed.
Canadian Intellectual Property Office, Office Action Dated Nov. 23, 2009, for Canadian Application No. 2,503,613 Filed May 21, 2004, pp. 4.

Korean Intellectual Property Office, Office Action for Korean Patent Application No. 10.2005-7007749 dated Mar. 9, 2010, pp. 2.

European Patent Office, Office Action for European Patent Application No. 03 781 551.1-1243 dated Dec. 3, 2010, pp. 2.

Lecurieux-Lafayette G: "Un Seul FPGA Dope Le Traitement D'Images", Electronique, CEP Communication, Paris, FR, No. 55, Jan. 1996, pp. 101-103.

Australian Patent Office—Examiner'S Report No. 3 Dated Jul. 13, 2010, for Australian Patent Application No. 2003287320, pp. 3.

United States Patent Office, Office Action for U.S. Appl. No. 12/151,116, dated Mar. 31, 2010, pp. 29.

United States Patent Office, Office Action for U.S. Appl. No. 10/683,929, dated Sep. 24, 2010, pp. 40.

Andree Filipov, "Application of Reconfigurable Computing to Acoustic Sensors", Oct. 2000, U.S. Army Research Laboratory, retieved from internet URL: stormingmedia.us/61/6122/A612293, pp. 1-16.

Erich Gamma Richard Helm Ralph Johnson John Vlissides, "Design Patterns Elements of Reusable Object-Oriented Software", Copyright 1995 by Addison Wesley Longman, Inc, pp. 21.

* cited by examiner

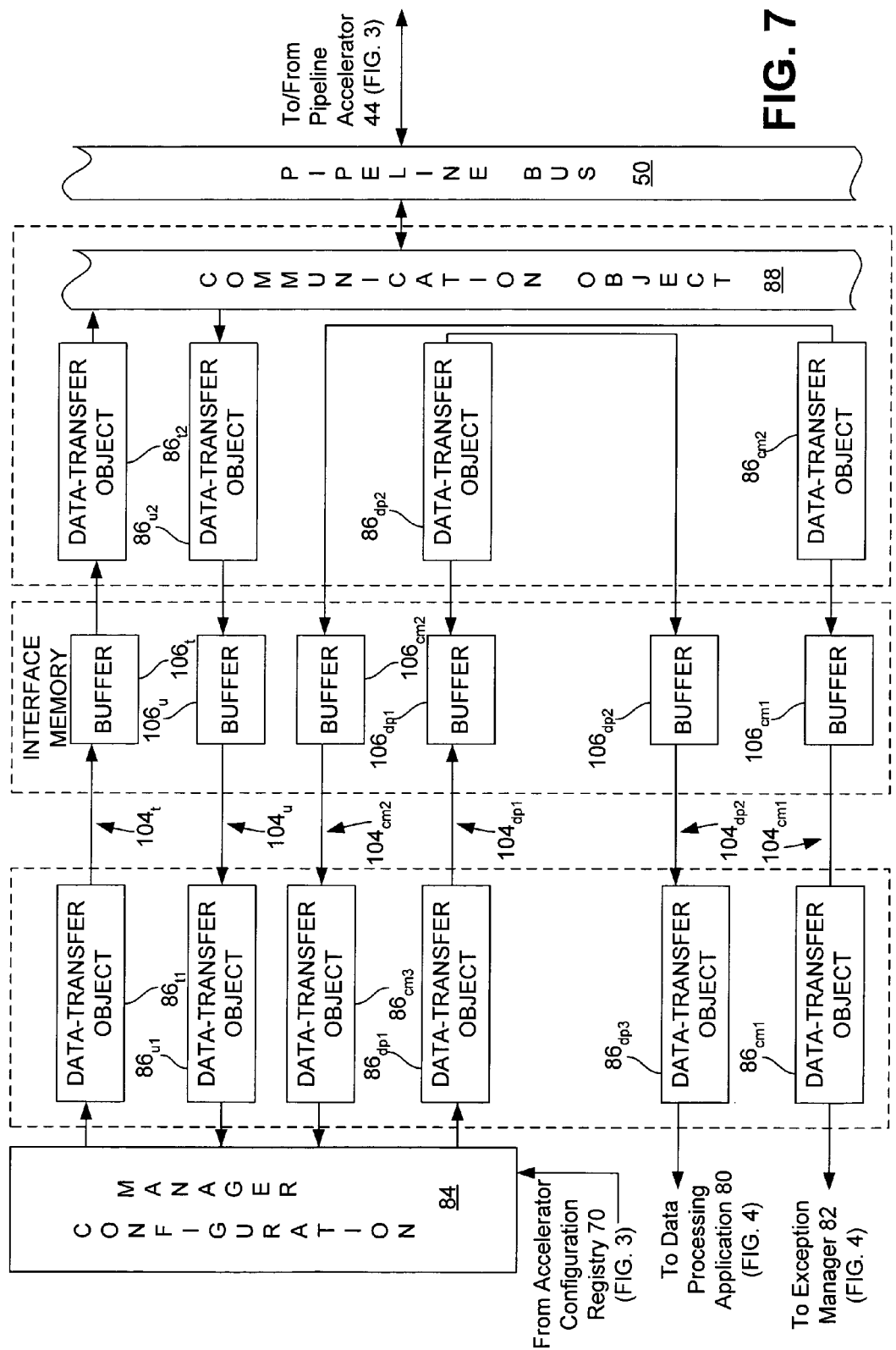

US 7,987,341 B2

COMPUTING MACHINE USING SOFTWARE OBJECTS FOR TRANSFERRING DATA THAT INCLUDES NO DESTINATION INFORMATION

CLAIM OF PRIORITY

This application claims priority to U.S. Provisional Application Ser. No. 60/422,503, filed on Oct. 31, 2002, which is incorporated by reference.

CROSS REFERENCE TO RELATED APPLICATIONS

This application is related to U.S. patent application Ser. Nos. 10/684,102 entitled IMPROVED COMPUTING ARCHITECTURE AND RELATED SYSTEM AND METHOD, 10/683,929 entitled PIPELINE ACCELERATOR FOR IMPROVED COMPUTING ARCHITECTURE AND RELATED SYSTEM AND METHOD, 10/684,057 entitled PROGRAMMABLE CIRCUIT AND RELATED COMPUTING MACHINE AND METHOD, and 10/683,932 entitled PIPELINE ACCELERATOR HAVING MULTIPLE PIPELINE UNITS AND RELATED COMPUTING MACHINE AND METHOD, which have a common filing date and owner and which are incorporated by reference.

BACKGROUND

A common computing architecture for processing relatively large amounts of data in a relatively short period of time includes multiple interconnected processors that share the processing burden. By sharing the processing burden, these multiple processors can often process the data more quickly than a single processor can for a given clock frequency. For example, each of the processors can process a respective portion of the data or execute a respective portion of a processing algorithm.

FIG. 1 is a schematic block diagram of a conventional computing machine 10 having a multi-processor architecture. The machine 10 includes a master processor 12 and coprocessors $14_1$-$14_n$, which communicate with each other and the master processor via a bus 16, an input port 18 for receiving raw data from a remote device (not shown in FIG. 1), and an output port 20 for providing processed data to the remote source. The machine 10 also includes a memory 22 for the master processor 12, respective memories $24_1$-$24_n$ for the coprocessors $14_1$-$14_n$, and a memory 26 that the master processor and coprocessors share via the bus 16. The memory 22 serves as both a program and a working memory for the master processor 12, and each memory $24_1$-$24_n$ serves as both a program and a working memory for a respective coprocessor $14_1$-$14_n$. The shared memory 26 allows the master processor 12 and the coprocessors 14 to transfer data among themselves, and from/to the remote device via the ports 18 and 20, respectively. The master processor 12 and the coprocessors 14 also receive a common clock signal that controls the speed at which the machine 10 processes the raw data.

In general, the computing machine 10 effectively divides the processing of raw data among the master processor 12 and the coprocessors 14. The remote source (not shown in FIG. 1) such as a sonar array loads the raw data via the port 18 into a section of the shared memory 26, which acts as a first-in-first-out (FIFO) buffer (not shown) for the raw data. The master processor 12 retrieves the raw data from the memory 26 via the bus 16, and then the master processor and the coprocessors 14 process the raw data, transferring data among themselves as necessary via the bus 16. The master processor 12 loads the processed data into another FIFO buffer (not shown) defined in the shared memory 26, and the remote source retrieves the processed data from this FIFO via the port 20.

In an example of operation, the computing machine 10 processes the raw data by sequentially performing n+1 respective operations on the raw data, where these operations together compose a processing algorithm such as a Fast Fourier Transform (FFT). More specifically, the machine 10 forms a data-processing pipeline from the master processor 12 and the coprocessors 14. For a given frequency of the clock signal, such a pipeline often allows the machine 10 to process the raw data faster than a machine having only a single processor.

After retrieving the raw data from the raw-data FIFO (not shown) in the memory 26, the master processor 12 performs a first operation, such as a trigonometric function, on the raw data. This operation yields a first result, which the processor 12 stores in a first-result FIFO (not shown) defined within the memory 26. Typically, the processor 12 executes a program stored in the memory 22, and performs the above-described actions under the control of the program. The processor 12 may also use the memory 22 as working memory to temporarily store data that the processor generates at intermediate intervals of the first operation.

Next, after retrieving the first result from the first-result FIFO (not shown) in the memory 26, the coprocessor $14_1$ performs a second operation, such as a logarithmic function, on the first result. This second operation yields a second result, which the coprocessor $14_1$ stores in a second-result FIFO (not shown) defined within the memory 26. Typically, the coprocessor $14_1$ executes a program stored in the memory $24_1$, and performs the above-described actions under the control of the program. The coprocessor $14_1$ may also use the memory $24_1$ as working memory to temporarily store data that the coprocessor generates at intermediate intervals of the second operation.

Then, the coprocessors $24_2$-$24_n$ sequentially perform third—$n^{th}$ operations on the second—$(n-1)^{th}$ results in a manner similar to that discussed above for the coprocessor $24_1$.

The $n^{th}$ operation, which is performed by the coprocessor $24_n$, yields the final result, i.e., the processed data. The coprocessor $24_n$ loads the processed data into a processed-data FIFO (not shown) defined within the memory 26, and the remote device (not shown in FIG. 1) retrieves the processed data from this FIFO.

Because the master processor 12 and coprocessors 14 are simultaneously performing different operations of the processing algorithm, the computing machine 10 is often able to process the raw data faster than a computing machine having a single processor that sequentially performs the different operations. Specifically, the single processor cannot retrieve a new set of the raw data until it performs all n+1 operations on the previous set of raw data. But using the pipeline technique discussed above, the master processor 12 can retrieve a new set of raw data after performing only the first operation. Consequently, for a given clock frequency, this pipeline technique can increase the speed at which the machine 10 processes the raw data by a factor of approximately n+1 as compared to a single-processor machine (not shown in FIG. 1).

Alternatively, the computing machine 10 may process the raw data in parallel by simultaneously performing n+1 instances of a processing algorithm, such as an FFT, on the raw data. That is, if the algorithm includes n+1 sequential operations as described above in the previous example, then each of the master processor 12 and the coprocessors 14 sequentially perform all n+1 operations on respective sets of the raw data. Consequently, for a given clock frequency, this parallel-processing technique, like the above-described pipeline technique, can increase the speed at which the machine 10 processes the raw data by a factor of approximately n+1 as compared to a single-processor machine (not shown in FIG. 1).

Unfortunately, although the computing machine 10 can process data more quickly than a single-processor computer machine (not shown in FIG. 1), the data-processing speed of the machine 10 is often significantly less than the frequency of the processor clock. Specifically, the data-processing speed of the computing machine 10 is limited by the time that the master processor 12 and coprocessors 14 require to process data. For brevity, an example of this speed limitation is discussed in conjunction with the master processor 12, although it is understood that this discussion also applies to the coprocessors 14. As discussed above, the master processor 12 executes a program that controls the processor to manipulate data in a desired manner. This program includes a sequence of instructions that the processor 12 executes. Unfortunately, the processor 12 typically requires multiple clock cycles to execute a single instruction, and often must execute multiple instructions to process a single value of data. For example, suppose that the processor 12 is to multiply a first data value A (not shown) by a second data value B (not shown). During a first clock cycle, the processor 12 retrieves a multiply instruction from the memory 22. During second and third clock cycles, the processor 12 respectively retrieves A and B from the memory 26. During a fourth clock cycle, the processor 12 multiplies A and B, and, during a fifth clock cycle, stores the resulting product in the memory 22 or 26 or provides the resulting product to the remote device (not shown). This is a best-case scenario, because in many cases the processor 12 requires additional clock cycles for overhead tasks such as initializing and closing counters. Therefore, at best the processor 12 requires five clock cycles, or an average of 2.5 clock cycles per data value, to process A and B.

Consequently, the speed at which the computing machine 10 processes data is often significantly lower than the frequency of the clock that drives the master processor 12 and the coprocessors 14. For example, if the processor 12 is clocked at 1.0 Gigahertz (GHz) but requires an average of 2.5 clock cycles per data value, then the effective data-processing speed equals (1.0 GHz)/2.5=0.4 GHz. This effective data-processing speed is often characterized in units of operations per second. Therefore, in this example, for a clock speed of 1.0 GHz, the processor 12 would be rated with a data-processing speed of 0.4 Gigaoperations/second (Gops).

FIG. 2 is a block diagram of a hardwired data pipeline 30 that can typically process data faster than a processor can for a given clock frequency, and often at substantially the same rate at which the pipeline is clocked. The pipeline 30 includes operator circuits $32_1$-$32_n$ that each perform a respective operation on respective data without executing program instructions. That is, the desired operation is "burned in" to a circuit 32 such that it implements the operation automatically, without the need of program instructions. By eliminating the overhead associated with executing program instructions, the pipeline 30 can typically perform more operations per second than a processor can for a given clock frequency.

For example, the pipeline 30 can often solve the following equation faster than a processor can for a given clock frequency:

$$Y(x_k) = (5x_k + 3)2^{x_k}$$

where $x_k$ represents a sequence of raw data values. In this example, the operator circuit $32_1$ is a multiplier that calculates $5x_k$, the circuit $32_2$ is an adder that calculates $5x_k+3$, and the circuit $32_n$ (n=3) is a multiplier that calculates $(5x_k+3)2^{x_k}$.

During a first clock cycle k=1, the circuit $32_1$ receives data value $x_1$ and multiplies it by 5 to generate $5x_1$.

During a second clock cycle k=2, the circuit $32_2$ receives $5x_1$ from the circuit $32_1$ and adds 3 to generate $5x_1+3$. Also, during the second clock cycle, the circuit $32_1$ generates $5x_2$.

During a third clock cycle k=3, the circuit $32_3$ receives $5x_1+3$ from the circuit $32_2$ and multiplies by $2^{x_1}$ (effectively left shifts $5x_1+3$ by $x_1$) to generate the first result $(5x_1+3)2^{x_1}$. Also during the third clock cycle, the circuit $32_1$ generates $5x_3$ and the circuit $32_2$ generates $5x_2+3$.

The pipeline 30 continues processing subsequent raw data values $x_k$ in this manner until all the raw data values are processed.

Consequently, a delay of two clock cycles after receiving a raw data value $x_1$—this delay is often called the latency of the pipeline 30—the pipeline generates the result $(5x_1+3)2^{x_1}$, and thereafter generates one result—e.g., $(5x_2+3)2^{x_2}$, $(5x_3+3)2^{x_3}$, ..., $5x_n+3)2^{x_n}$—each clock cycle.

Disregarding the latency, the pipeline 30 thus has a data-processing speed equal to the clock speed. In comparison, assuming that the master processor 12 and coprocessors 14 (FIG. 1) have data-processing speeds that are 0.4 times the clock speed as in the above example, the pipeline 30 can process data 2.5 times faster than the computing machine 10 (FIG. 1) for a given clock speed.

Still referring to FIG. 2, a designer may choose to implement the pipeline 30 in a programmable logic IC (PLIC), such as a field-programmable gate array (FPGA), because a PLIC allows more design and modification flexibility than does an application specific IC (ASIC). To configure the hardwired connections within a PLIC, the designer merely sets interconnection-configuration registers disposed within the PLIC to predetermined binary states. The combination of all these binary states is often called "firmware." Typically, the designer loads this firmware into a nonvolatile memory (not shown in FIG. 2) that is coupled to the PLIC. When one "turns on" the PLIC, it downloads the firmware from the memory into the interconnection-configuration registers. Therefore, to modify the functioning of the PLIC, the designer merely modifies the firmware and allows the PLIC to download the modified firmware into the interconnection-configuration registers. This ability to modify the PLIC by merely modifying the firmware is particularly useful during the prototyping stage and for upgrading the pipeline 30 "in the field".

Unfortunately, the hardwired pipeline 30 typically cannot execute all algorithms, particularly those that entail significant decision making. A processor can typically execute a decision-making instruction (e.g., conditional instructions such as "if A, then go to B, else go to C") approximately as fast as it can execute an operational instruction (e.g., "A+B") of comparable length. But although the pipeline 30 may be able to make a relatively simple decision (e.g., "A>B?"), it typically cannot execute a relatively complex decision (e.g., "if A, then go to B, else go to C"). And although one may be able to design the pipeline 30 to execute such a complex decision, the size and complexity of the required circuitry often makes such a design impractical, particularly where an algorithm includes multiple different complex decisions.

Consequently, processors are typically used in applications that require significant decision making, and hardwired pipelines are typically limited to "number crunching" applications that entail little or no decision making.

Furthermore, as discussed below, it is typically much easier for one to design/modify a processor-based computing machine, such as the computing machine 10 of FIG. 1, than it is to design/modify a hardwired pipeline such as the pipeline 30 of FIG. 2, particularly where the pipeline 30 includes multiple PLICs.

Computing components, such as processors and their peripherals (e.g., memory), typically include industry-standard communication interfaces that facilitate the interconnection of the components to form a processor-based computing machine.

Typically, a standard communication interface includes two layers: a physical layer and a service layer.

The physical layer includes the circuitry and the corresponding circuit interconnections that form the interface and the operating parameters of this circuitry. For example, the physical layer includes the pins that connect the component to a bus, the buffers that latch data received from the pins, and the drivers that drive data onto the pins. The operating parameters include the acceptable voltage range of the data signals that the pins receive, the signal timing for writing and reading data, and the supported modes of operation (e.g., burst mode, page mode). Conventional physical layers include transistor-transistor logic (TTL) and RAMBUS.

The service layer includes the protocol by which a computing component transfers data. The protocol defines the format of the data and the manner in which the component sends and receives the formatted data. Conventional communication protocols include file-transfer protocol (FTP) and TCP/IP (expand).

Consequently, because manufacturers and others typically design computing components having industry-standard communication interfaces, one can typically design the interface of such a component and interconnect it to other computing components with relatively little effort. This allows one to devote most of his time to designing the other portions of the computing machine, and to easily modify the machine by adding or removing components.

Designing a computing component that supports an industry-standard communication interface allows one to save design time by using an existing physical-layer design from a design library. This also insures that he/she can easily interface the component to off-the-shelf computing components.

And designing a computing machine using computing components that support a common industry-standard communication interface allows the designer to interconnect the components with little time and effort. Because the components support a common interface, the designer can interconnect them via a system bus with little design effort. And because the supported interface is an industry standard, one can easily modify the machine. For example, one can add different components and peripherals to the machine as the system design evolves, or can easily add/design next-generation components as the technology evolves. Furthermore, because the components support a common industry-standard service layer, one can incorporate into the computing machine's software an existing software module that implements the corresponding protocol. Therefore, one can interface the components with little effort because the interface design is essentially already in place, and thus can focus on designing the portions (e.g., software) of the machine that cause the machine to perform the desired function(s).

But unfortunately, there are no known industry-standard communication interfaces for components, such as PLICs, used to form hardwired pipelines such as the pipeline 30 of FIG. 2.

Consequently, to design a pipeline having multiple PLICs, one typically spends a significant amount of time and exerts a significant effort designing and debugging the communication interface between the PLICs "from scratch." Typically, such an ad hoc communication interface depends on the parameters of the data being transferred between the PLICs. Likewise, to design a pipeline that interfaces to a processor, one would have to spend a significant amount of time and exert a significant effort in designing and debugging the communication interface between the pipeline and the processor from scratch.

Similarly, to modify such a pipeline by adding a PLIC to it, one typically spends a significant amount of time and exerts a significant effort designing and debugging the communication interface between the added PLIC and the existing PLICs. Likewise, to modify a pipeline by adding a processor, or to modify a computing machine by adding a pipeline, one would have to spend a significant amount of time and exert a significant effort in designing and debugging the communication interface between the pipeline and processor.

Consequently, referring to FIGS. 1 and 2, because of the difficulties in interfacing multiple PLICs and in interfacing a processor to a pipeline, one is often forced to make significant tradeoffs when designing a computing machine. For example, with a processor-based computing machine, one is forced to trade number-crunching speed and design/modification flexibility for complex decision-making ability. Conversely, with a hardwired pipeline-based computing machine, one is forced to trade complex-decision-making ability and design/modification flexibility for number-crunching speed. Furthermore, because of the difficulties in interfacing multiple PLICs, it is often impractical for one to design a pipeline-based machine having more than a few PLICs. As a result, a practical pipeline-based machine often has limited functionality. And because of the difficulties in interfacing a processor to a PLIC, it would be impractical to interface a processor to more than one PLIC. As a result, the benefits obtained by combining a processor and a pipeline would be minimal.

Therefore, a need has arisen for a new computing architecture that allows one to combine the decision-making ability of a processor-based machine with the number-crunching speed of a hardwired-pipeline-based machine.

SUMMARY

In an embodiment of the invention, a computing machine includes a first buffer and a processor coupled to the buffer. The processor is operable to execute an application, a first data-transfer object, and a second data-transfer object, publish data under the control of the application, load the published data into the buffer under the control of the first data-transfer object, and retrieve the published data from the buffer under the control of the second data-transfer object.

According to another embodiment of the invention, the processor is operable to retrieve data and load the retrieved data into the buffer under the control of the first data-transfer object, unload the data from the buffer under the control of the second data-transfer object, and process the unloaded data under the control of the application.

Where the computing machine is a peer-vector machine that includes a hardwired pipeline accelerator coupled to the processor, the buffer and data-transfer objects facilitate the transfer of data—whether unidirectional or bidirectional—between the application and the accelerator.

BRIEF DESCRIPTION OF THE DRAWINGS

FIG. 7 is a functional block diagram of the data-transfer paths between the accelerator configuration manager and the pipeline bus of FIG. 4 according to an embodiment of the invention.

DETAILED DESCRIPTION

Figure 1:
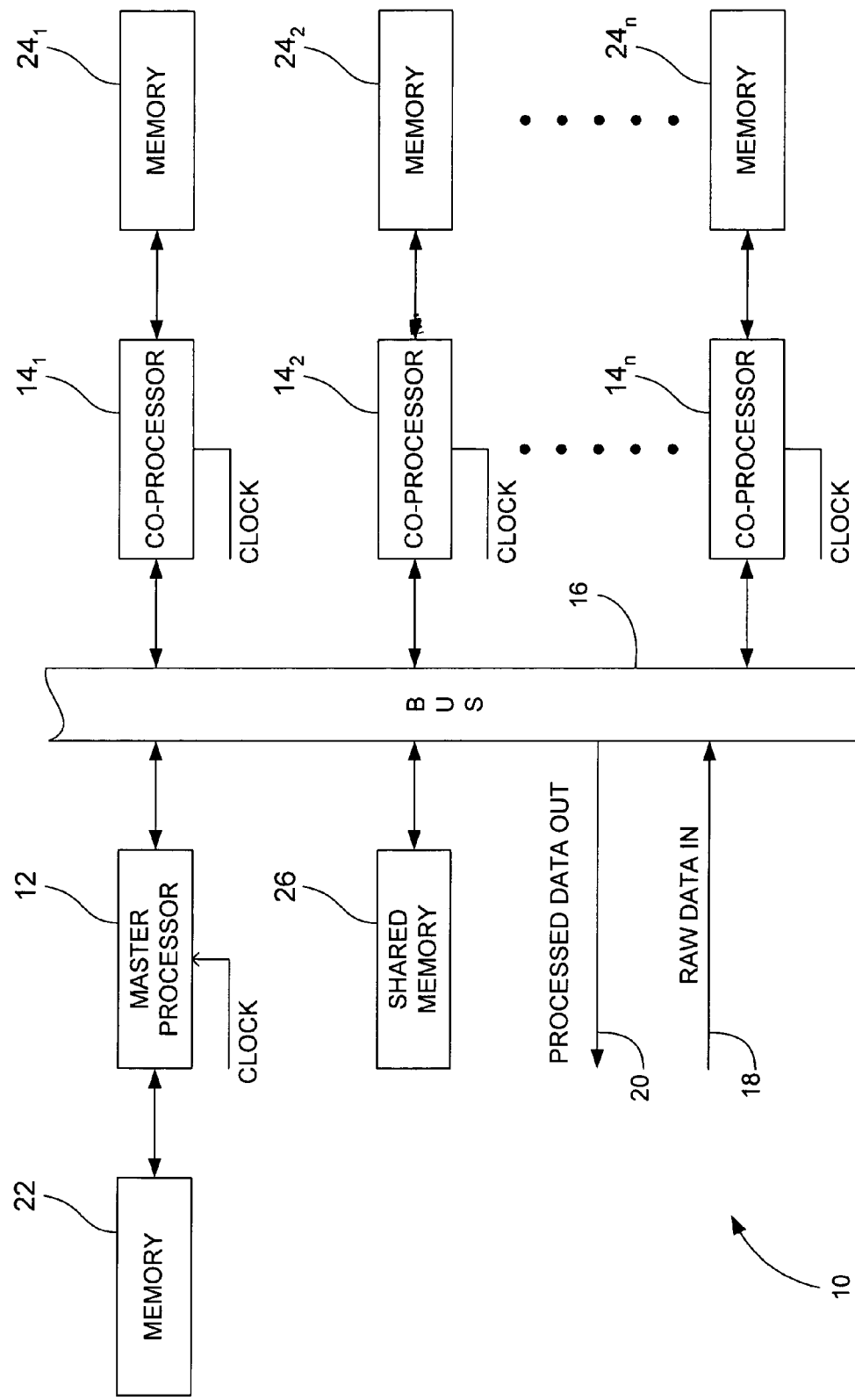
FIG. 1 is a block diagram of a computing machine having a conventional multi-processor architecture.
Figure 2:
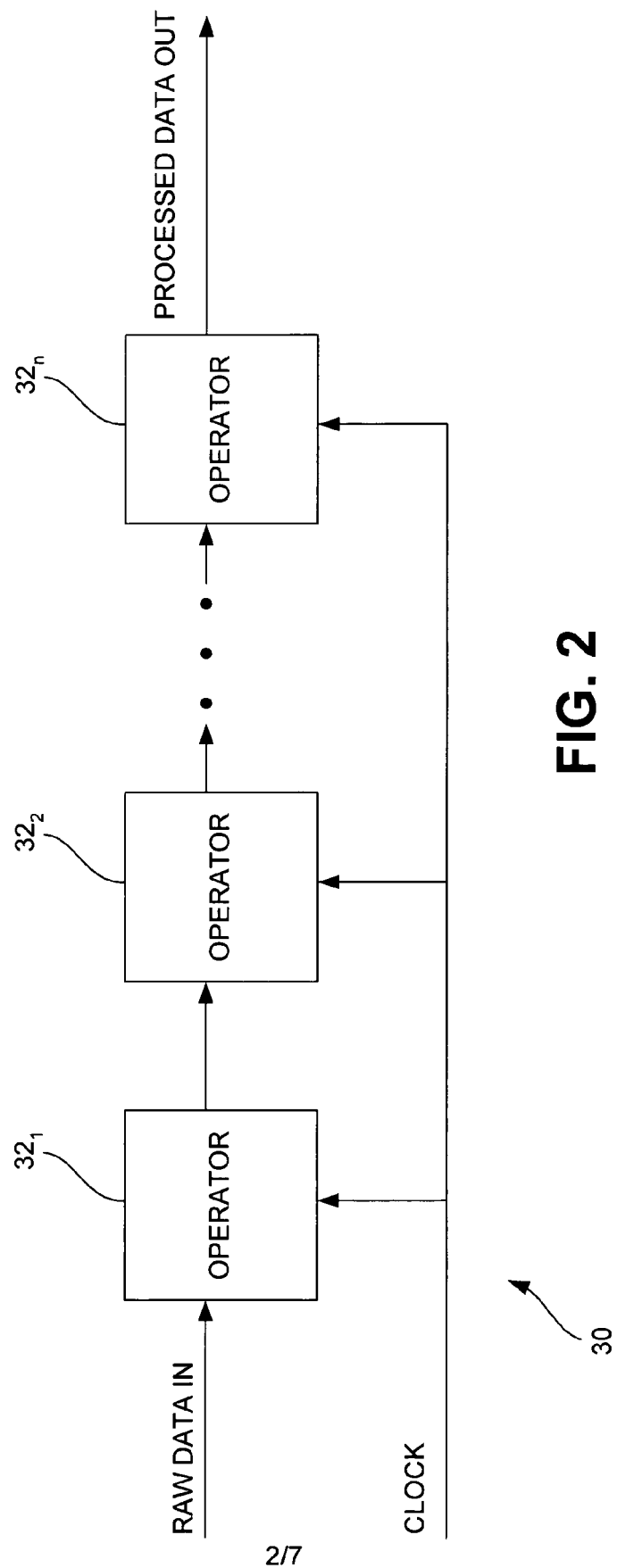
FIG. 2 is a block diagram of a conventional hardwired pipeline.
Figure 3:
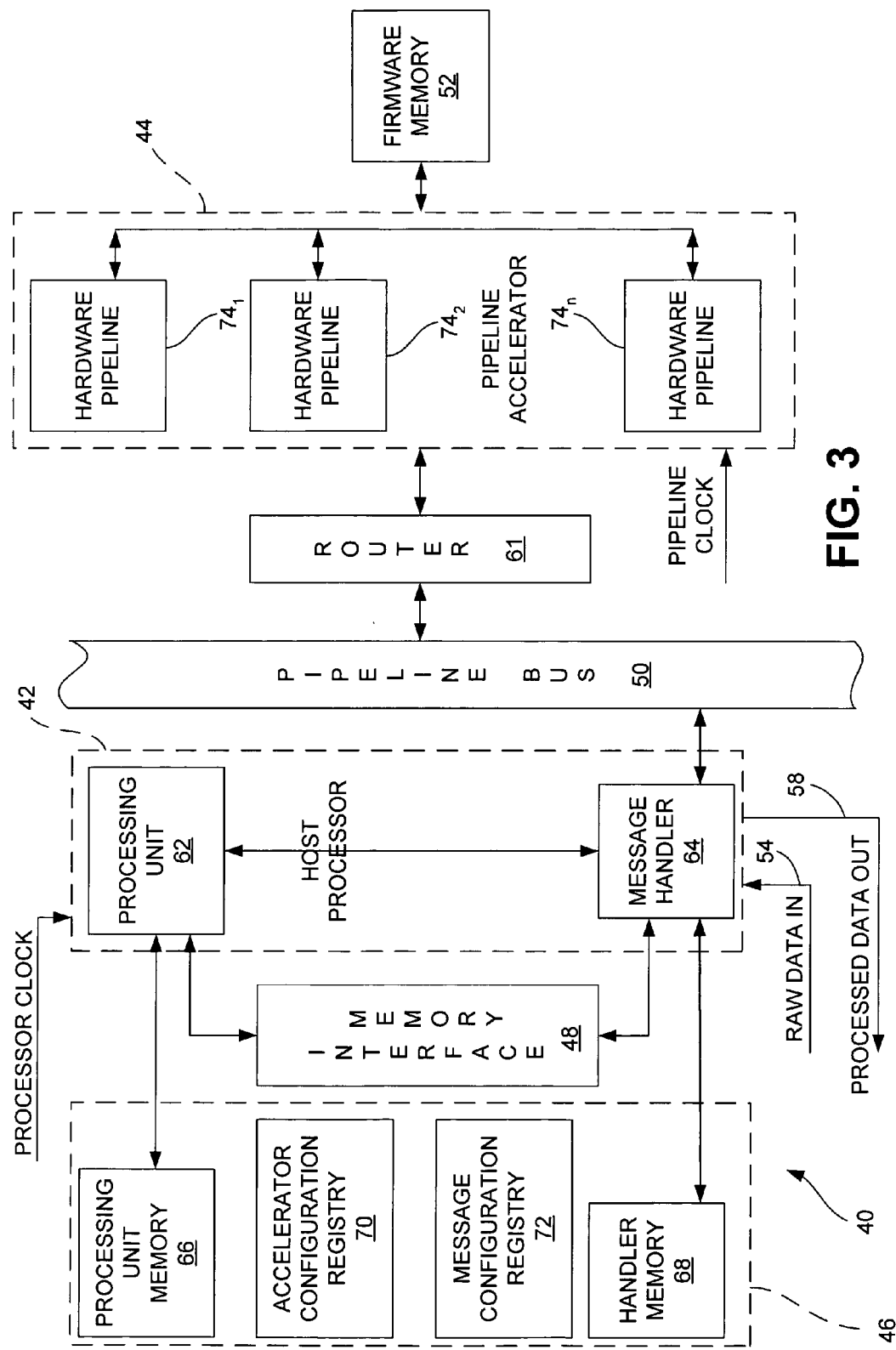
FIG. 3 is schematic block diagram of a computing machine having a peer-vector architecture according to an embodiment of the invention.

FIG. 3 is a schematic block diagram of a computing machine 40, which has a peer-vector architecture according to an embodiment of the invention. In addition to a host processor 42, the peer-vector machine 40 includes a pipeline accelerator 44, which performs at least a portion of the data processing, and which thus effectively replaces the bank of coprocessors 14 in the computing machine 10 of FIG. 1. Therefore, the host-processor 42 and the accelerator 44 are "peers" that can transfer data vectors back and forth. Because the accelerator 44 does not execute program instructions, it typically performs mathematically intensive operations on data significantly faster than a bank of coprocessors can for a given clock frequency. Consequently, by combing the decision-making ability of the processor 42 and the number-crunching ability of the accelerator 44, the machine 40 has the same abilities as, but can often process data faster than, a conventional computing machine such as the machine 10. Furthermore, as discussed below and in previously cited U.S. patent application Ser. No. 10/683,929 entitled PIPELINE ACCELERATOR FOR IMPROVED COMPUTING ARCHITECTURE AND RELATED SYSTEM AND METHOD, providing the accelerator 44 with the same communication interface as the host processor 42 facilitates the design and modification of the machine 40, particularly where the communications interface is an industry standard. And where the accelerator 44 includes multiple components (e.g., PLICs), providing these components with this same communication interface facilitates the design and modification of the accelerator, particularly where the communication interface is an industry standard. Moreover, the machine 40 may also provide other advantages as described below and in the previously cited patent applications.

Still referring to FIG. 3, in addition to the host processor 42 and the pipeline accelerator 44, the peer-vector computing machine 40 includes a processor memory 46, an interface memory 48, a bus 50, a firmware memory 52, optional raw-data input port 54, processed-data output port 58, and an optional router 61.

The host processor 42 includes a processing unit 62 and a message handler 64, and the processor memory 46 includes a processing-unit memory 66 and a handler memory 68, which respectively serve as both program and working memories for the processor unit and the message handler. The processor memory 46 also includes an accelerator-configuration registry 70 and a message-configuration registry 72, which store respective configuration data that allow the host processor 42 to configure the functioning of the accelerator 44 and the structure of the messages that the message handler 64 sends and receives.

The pipeline accelerator 44 is disposed on at least one PLIC (not shown) and includes hardwired pipelines $74_1$-$74_n$, which process respective data without executing program instructions. The firmware memory 52 stores the configuration firmware for the accelerator 44. If the accelerator 44 is disposed on multiple PLICs, these PLICs and their respective firmware memories may be disposed on multiple circuit boards, i.e., daughter cards (not shown). The accelerator 44 and daughter cards are discussed further in previously cited U.S. patent application Ser. Nos. 10/683,929 entitled PIPELINE ACCELERATOR FOR IMPROVED COMPUTING ARCHITECTURE AND RELATED SYSTEM AND METHOD and 10/683,932 entitled PIPELINE ACCELERATOR HAVING MULTIPLE PIPELINE UNITS AND RELATED COMPUTING MACHINE AND METHOD. Alternatively, the accelerator 44 may be disposed on at least one ASIC, and thus may have internal interconnections that are unconfigurable. In this alternative, the machine 40 may omit the firmware memory 52. Furthermore, although the accelerator 44 is shown including multiple pipelines 74, it may include only a single pipeline. In addition, although not shown, the accelerator 44 may include one or more processors such as a digital-signal processor (DSP).

Figure 4:
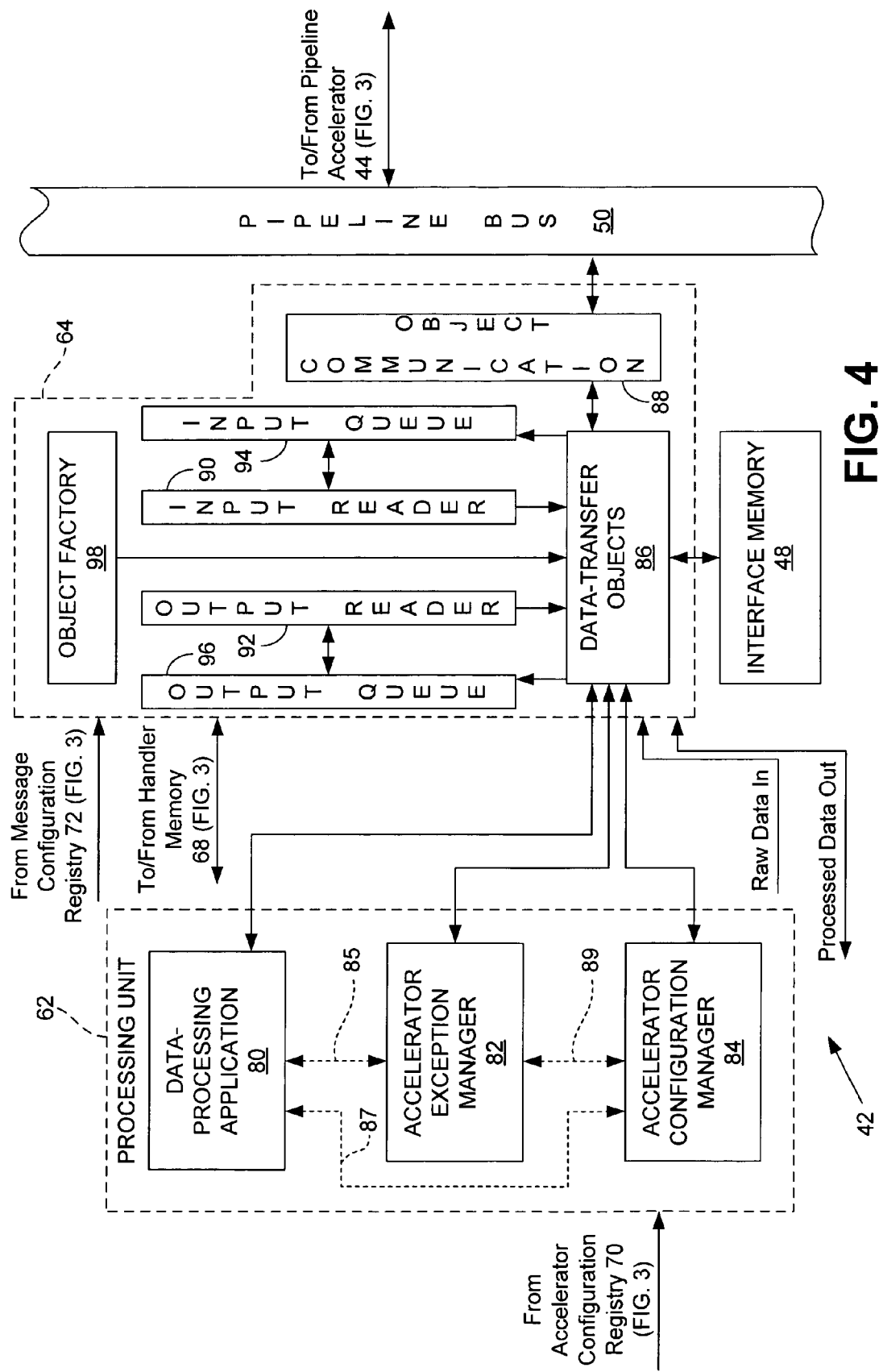
FIG. 4 is a functional block diagram of the host processor of FIG. 3 according to an embodiment of the invention.

The general operation of the peer-vector machine 40 is discussed in previously cited U.S. patent application Ser. No. 10/684,102 entitled IMPROVED COMPUTING ARCHITECTURE AND RELATED SYSTEM AND METHOD, and the functional topology and operation of the host processor 42 is discussed below in conjunction with FIGS. 4-7. FIG. 4 is a functional block diagram of the host processor 42 and the pipeline bus 50 of FIG. 3 according to an embodiment of the invention. Generally, the processing unit 62 executes one or more software applications, and the message handler 64 executes one or more software objects that transfer data between the software application(s) and the pipeline accelerator 44 (FIG. 3). Splitting the data-processing, data-transferring, and other functions among different applications and objects allows for easier design and modification of the host-processor software. Furthermore, although in the following description a software application is described as performing a particular operation, it is understood that in actual operation, the processing unit 62 or message handler 64 executes the software application and performs this operation under the control of the application. Likewise, although in the following description a software object is described as performing a particular operation, it is understood that in actual operation, the processing unit 62 or message handler 64 executes the software object and performs this operation under the control of the object.

Still referring to FIG. 4, the processing unit 62 executes a data-processing application 80, an accelerator exception manager application (hereinafter the exception manager) 82, and an accelerator configuration manager application (hereinafter the configuration manager) 84, which are collectively referred to as the processing-unit applications. The data-processing application processes data in cooperation with the pipeline accelerator 44 (FIG. 3). For example, the data-processing application 80 may receive raw sonar data via the port 54 (FIG. 3), parse the data, and send the parsed data to the accelerator 44, and the accelerator may perform an FFT on the parsed data and return the processed data to the data-processing application for further processing. The exception manager 82 handles exception messages from the accelerator 44, and the configuration manager 84 loads the accelerator's configuration firmware into the memory 52 during initialization of the peer-vector machine 40 (FIG. 3). The configuration manager 84 may also reconfigure the accelerator 44 after initialization in response to, e.g., a malfunction of the accelerator. As discussed further below in conjunction with FIGS. 6-7, the processing-unit applications may communicate with each other directly as indicated by the dashed lines 85, 87, and 89, or may communicate with each other via the data-transfer objects 86. The message handler 64 executes the data-transfer objects 86, a communication object 88, and input and output read objects 90 and 92, and may execute input and output queue objects 94 and 96. The data-transfer objects 86 transfer data between the communication object 88 and the processing-unit applications, and may use the interface memory 48 as a data buffer to allow the processing-unit applications and the accelerator 44 to operate independently. For example, the memory 48 allows the accelerator 44, which is often faster than the data-processing application 80, to operate without "waiting" for the data-processing application. The communication object 88 transfers data between the data objects 86 and the pipeline bus 50. The input and output read objects 90 and 92 control the data-transfer objects 86 as they transfer data between the communication object 88 and the processing-unit applications. And, when executed, the input and output queue objects 94 and 96 cause the input and output read objects 90 and 92 to synchronize this transfer of data according to a desired priority.

Furthermore, during initialization of the peer-vector machine 40 (FIG. 3), the message handler 64 instantiates and executes a conventional object factory 98, which instantiates the data-transfer objects 86 from configuration data stored in the message-configuration registry 72 (FIG. 3). The message handler 64 also instantiates the communication object 88, the input and output reader objects 90 and 92, and the input and output queue objects 94 and 96 from the configuration data stored in the message-configuration registry 72. Consequently, one can design and modify these software objects, and thus their data-transfer parameters, by merely designing or modifying the configuration data stored in the registry 72. This is typically less time consuming than designing or modifying each software object individually.

The operation of the host processor 42 of FIG. 4 is discussed below in conjunction with FIGS. 5-7.

Data Processing

Figure 5:
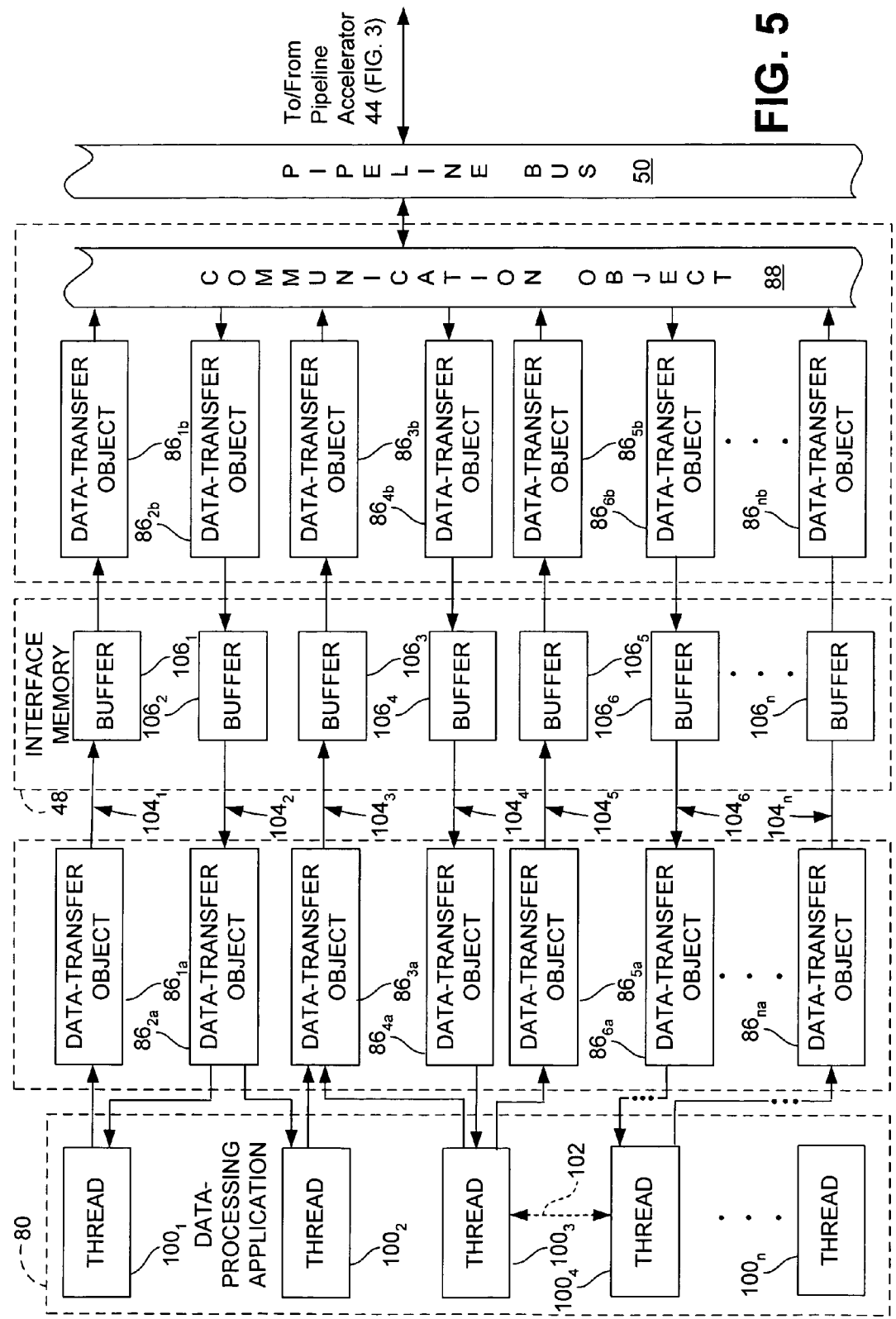
FIG. 5 is a functional block diagram of the data-transfer paths between the data-processing application and the pipeline bus of FIG. 4 according to an embodiment of the invention.

FIG. 5 is a functional block diagram of the data-processing application 80, the data-transfer objects 86, and the interface memory 48 of FIG. 4 according to an embodiment of the invention.

The data-processing application 80 includes a number of threads $100_1$-$100_n$, which each perform a respective data-processing operation. For example, the thread $100_1$ may perform an addition, and the thread $100_2$ may perform a subtraction, or both the threads $100_1$ and $100_2$ may perform an addition.

Each thread 100 generates, i.e., publishes, data destined for the pipeline accelerator 44 (FIG. 3), receives, i.e., subscribes to, data from the accelerator, or both publishes and subscribes to data. For example, each of the threads $100_1$-$100_4$ both publish and subscribe to data from the accelerator 44. A thread 100 may also communicate directly with another thread 100. For example, as indicated by the dashed line 102, the threads $100_3$ and $100_4$ may directly communicate with each other. Furthermore, a thread 100 may receive data from or send data to a component (not shown) other than the accelerator 44 (FIG. 3). But for brevity, discussion of data transfer between the threads 100 and such another component is omitted.

Still referring to FIG. 5, the interface memory 48 and the data-transfer objects $86_{1a}$-$86_{nb}$ functionally form a number of unidirectional channels $104_1$-$104_n$ for transferring data between the respective threads 100 and the communication object 88. The interface memory 48 includes a number of buffers $106_1$-$106_n$, one buffer per channel 104. The buffers 106 may each hold a single grouping (e.g., byte, word, block) of data, or at least some of the buffers may be FIFO buffers that can each store respective multiple groupings of data. There are also two data objects 86 per channel 104, one for transferring data between a respective thread 100 and a respective buffer 106, and the other for transferring data between the buffer 106 and the communication object 88. For example, the channel $104_1$ includes a buffer $106_1$, a data-transfer object $86_{1a}$ for transferring published data from the thread $100_1$ to the buffer $106_1$, and a data-transfer object $86_{1b}$ for transferring the published data from the buffer $106_1$ to the communication object 88. Including a respective channel 104 for each allowable data transfer reduces the potential for data bottlenecks and also facilitates the design and modification of the host processor 42 (FIG. 4).

Referring to FIGS. 3-5, the operation of the host processor 42 during its initialization and while executing the data-processing application 80, the data-transfer objects 86, the communication object 88, and the optional reader and queue objects 90, 92, 94, and 96 is discussed according to an embodiment of the invention.

During initialization of the host processor 42, the object factory 98 instantiates the data-transfer objects 86 and defines the buffers 104. Specifically, the object factory 98 downloads the configuration data from the registry 72 and generates the software code for each data-transfer object $86_{xb}$ that the data-processing application 80 may need. The identity of the data-transfer objects $86_{xb}$ that the application 80 may need is typically part of the configuration data—the application 80, however, need not use all of the data-transfer objects 86. Then, from the generated objects $86_{xb}$, the object factory 98 respectively instantiates the data objects $86_{xa}$. Typically, as discussed in the example below, the object factory 98 instantiates data-transfer objects $86_{xa}$ and $86_{xb}$ that access the same buffer 104 as multiple instances of the same software code. This reduces the amount of code that the object factory 98 would otherwise generate by approximately one half. Furthermore, the message handler 64 may determine which, if any, data-transfer objects 86 the application 80 does not need, and delete the instances of these unneeded data-transfer objects to save memory. Alternatively, the message handler 64 may make this determination before the object factory 98 generates the data-transfer objects 86, and cause the object factory to instantiate only the data-transfer objects that the application 80 needs. In addition, because the data-transfer objects 86 include the addresses of the interface memory 48 where the respective buffers 104 are located, the object factory 98 effectively defines the sizes and locations of the buffers when it instantiates the data-transfer objects.

For example, the object factory 98 instantiates the data-transfer objects $86_{1a}$ and $86_{1b}$ in the following manner. First, the factory 98 downloads the configuration data from the registry 72 and generates the common software code for the data-transfer object $86_{1a}$ and $86_{1b}$. Next, the factory 98 instantiates the data-transfer objects $86_{1a}$ and $86_{1b}$ as respective instances of the common software code. That is, the message handler 64 effectively copies the common software code to two locations of the handler memory 68 or to other program memory (not shown), and executes one location as the object $86_{1a}$ and the other location as the object $86_{1b}$.

Still referring to FIGS. 3-5, after initialization of the host processor 42, the data-processing application 80 processes data and sends data to and receives data from the pipeline accelerator 44.

An example of the data-processing application 80 sending data to the accelerator 44 is discussed in conjunction with the channel $104_1$.

First, the thread $100_1$ generates and publishes data to the data-transfer object $86_{1a}$. The thread $100_1$ may generate the data by operating on raw data that it receives from the accelerator 44 (further discussed below) or from another source (not shown) such as a sonar array or a data base via the port 54.

Then, the data-object $86_{1a}$ loads the published data into the buffer $106_1$.

Next, the data-transfer object $86_{1b}$ determines that the buffer $106_1$ has been loaded with newly published data from the data-transfer object $86_{1a}$. The output reader object 92 may periodically instruct the data-transfer object $86_{1b}$ to check the buffer $106_1$ for newly published data. Alternatively, the output reader object 92 notifies the data-transfer object $86_{1b}$ when the buffer $106_1$ has received newly published data. Specifically, the output queue object 96 generates and stores a unique identifier (not shown) in response to the data-transfer object $86_{1a}$ storing the published data in the buffer $106_1$. In response to this identifier, the output reader object 92 notifies the data-transfer object $86_{1b}$ that the buffer $106_1$ contains newly published data. Where multiple buffers 106 contain respective newly published data, then the output queue object 96 may record the order in which this data was published, and the output reader object 92 may notify the respective data-transfer objects $86_{xb}$ in the same order. Thus, the output reader object 92 and the output queue object 96 synchronize the data transfer by causing the first data published to be the first data that the respective data-transfer object $86_{xb}$ sends to the accelerator 44, the second data published to be the second data that the respective data-transfer object $86_{xb}$ sends to the accelerator, etc. In another alternative where multiple buffers 106 contain respective newly published data, the output reader and output queue objects 92 and 96 may implement a priority scheme other than, or in addition to, this first-in-first-out scheme. For example, suppose the thread $100_1$ publishes first data, and subsequently the thread $100_2$ publishes second data but also publishes to the output queue object 96 a priority flag associated with the second data. Because the second data has priority over the first data, the output reader object 92 notifies the data-transfer object $86_{2b}$ of the published second data in the buffer $106_2$ before notifying the data-transfer object $86_{1b}$ of the published first data in the buffer $106_1$.

Then, the data-transfer object $86_{1b}$ retrieves the published data from the buffer $106_1$ and formats the data in a predetermined manner. For example, the object $86_{1b}$ generates a message that includes the published data (i.e., the payload) and a header that, e.g., identifies the destination of the data within the accelerator 44. This message may have an industry-standard format such as the Rapid IO (input/output) format. Because the generation of such a message is conventional, it is not discussed further.

After the data-transfer object $86_{1b}$ formats the published data, it sends the formatted data to the communication object 88.

Next, the communication object 88 sends the formatted data to the pipeline accelerator 44 via the bus 50. The communication object 88 is designed to implement the communication protocol (e.g., Rapid IO, TCP/IP) used to transfer data between the host processor 42 and the accelerator 44. For example, the communication object 88 implements the required hand shaking and other transfer parameters (e.g., arbitrating the sending and receiving of messages on the bus 50) that the protocol requires. Alternatively, the data-transfer object $86_{xb}$ can implement the communication protocol, and the communication object 88 can be omitted. However, this latter alternative is less efficient because it requires all the data-transfer objects $86_{xb}$ to include additional code and functionality.

The pipeline accelerator 44 then receives the formatted data, recovers the data from the message (e.g., separates the data from the header if there is a header), directs the data to the proper destination within the accelerator, and processes the data.

Still referring to FIGS. 3-5, an example of the pipeline accelerator 44 (FIG. 3) sending data to the host processor 42 (FIG. 3) is discussed in conjunction with the channel $104_2$.

First, the pipeline accelerator 44 generates and formats data. For example, the accelerator 44 generates a message that includes the data payload and a header that, e.g., identifies the destination threads $100_1$ and $100_2$, which are the threads that are to receive and process the data. As discussed above, this message may have an industry-standard format such as the Rapid IO (input/output) format.

Next, the accelerator 44 drives the formatted data onto the bus 50 in a conventional manner.

Then, the communication object 88 receives the formatted data from the bus 50 and provides the formatted data to the data-transfer object $86_{2b}$. In one embodiment, the formatted data is in the form of a message, and the communication object 88 analyzes the message header (which, as discussed above, identifies the destination threads $100_1$ and $100_2$) and provides the message to the data-transfer object $86_{2b}$ in response to the header. In another embodiment, the communication object 88 provides the message to all of the data-transfer objects $86_{nb}$, each of which analyzes the message header and processes the message only if its function is to provide data to the destination threads $100_1$ and $100_2$. Consequently, in this example, only the data-transfer object $86_{2b}$ processes the message.

Next, the data-transfer object $86_{2b}$ loads the data received from the communication object 88 into the buffer $106_2$. For example, if the data is contained within a message payload, the data-transfer object $86_{2b}$ recovers the data from the message (e.g., by stripping the header) and loads the recovered data into the buffer $106_2$.

Then, the data-transfer object $86_{2a}$ determines that the buffer $106_2$ has received new data from the data-transfer object $86_{2b}$. The input reader object 90 may periodically instruct the data-transfer object $86_{2a}$ to check the buffer $106_2$ for newly received data. Alternatively, the input reader object 90 notifies the data-transfer object $86_{2a}$ when the buffer $106_2$ has received newly published data. Specifically, the input queue object 94 generates and stores a unique identifier (not shown) in response to the data-transfer object $86_{2b}$ storing the published data in the buffer $106_2$. In response to this identifier, the input reader object 90 notifies the data-transfer object $86_{2a}$ that the buffer $106_2$ contains newly published data. As discussed above in conjunction with the output reader and output queue objects 92 and 96, where multiple buffers 106 contain respective newly published data, then the input queue object 94 may record the order in which this data was published, and the input reader object 90 may notify the respective data-transfer objects $86_{xa}$ in the same order. Alternatively, where multiple buffers 106 contain respective newly published data, the input reader and input queue objects 90 and 94 may implement a priority scheme other than, or in addition to, this first-in-first-out scheme.

Next, the data-object $86_{2a}$ transfers the data from the buffer $106_2$ to the subscriber threads $100_1$ and $100_2$, which perform respective operations on the data.

Referring to FIG. 5, an example of one thread receiving and processing data from another thread is discussed in conjunction with the thread $100_4$ receiving and processing data published by the thread $100_3$.

In one embodiment, the thread $100_3$ publishes the data directly to the thread $100_4$ via the optional connection (dashed line) 102.

In another embodiment, the thread $100_3$ publishes the data to the thread $100_4$ via the channels $104_5$ and $104_6$. Specifically, the data-transfer object $86_{5a}$ loads the published data into the buffer $106_5$. Next, the data-transfer object $86_{5b}$ retrieves the data from the buffer $106_5$ and transfers the data to the communication object 88, which publishes the data to the data-transfer object $86_{6b}$. Then, the data-transfer object $86_{6b}$ loads the data into the buffer $106_6$. Next, the data-transfer object $86_{6a}$ transfers the data from the buffer $106_6$ to the thread $100_4$. Alternatively, because the data is not being transferred via the bus 50, then one may modify the data-transfer object $86_{5b}$ such that it loads the data directly into the buffer $106_6$, thus bypassing the communication object 88 and the data-transfer object $86_{6b}$. But modifying the data-transfer object $86_{5b}$ to be different from the other data-transfer objects 86 may increase the complexity modularity of the message handler 64.

Still referring to FIG. 5, additional data-transfer techniques are contemplated. For example a single thread may publish data to multiple locations within the pipeline accelerator 44 (FIG. 3) via respective multiple channels. Alternatively, as discussed in previously cited U.S. patent application Ser. Nos. 10/684,102 entitled IMPROVED COMPUTING ARCHITECTURE AND RELATED SYSTEM AND METHOD and 10/683,929 entitled PIPELINE ACCELERATOR FOR IMPROVED COMPUTING ARCHITECTURE AND RELATED SYSTEM AND METHOD, the accelerator 44 may receive data via a single channel 104 and provide it to multiple locations within the accelerator. Furthermore, multiple threads (e.g., threads $100_1$ and $100_2$) may subscribe to data from the same channel (e.g., channel $104_2$). In addition, multiple threads (e.g., threads $100_2$ and $100_3$) may publish data to the same location within the accelerator 44 via the same channel (e.g., channel $104_3$), although the threads may publish data to the same accelerator location via respective channels 104.

Figure 6:
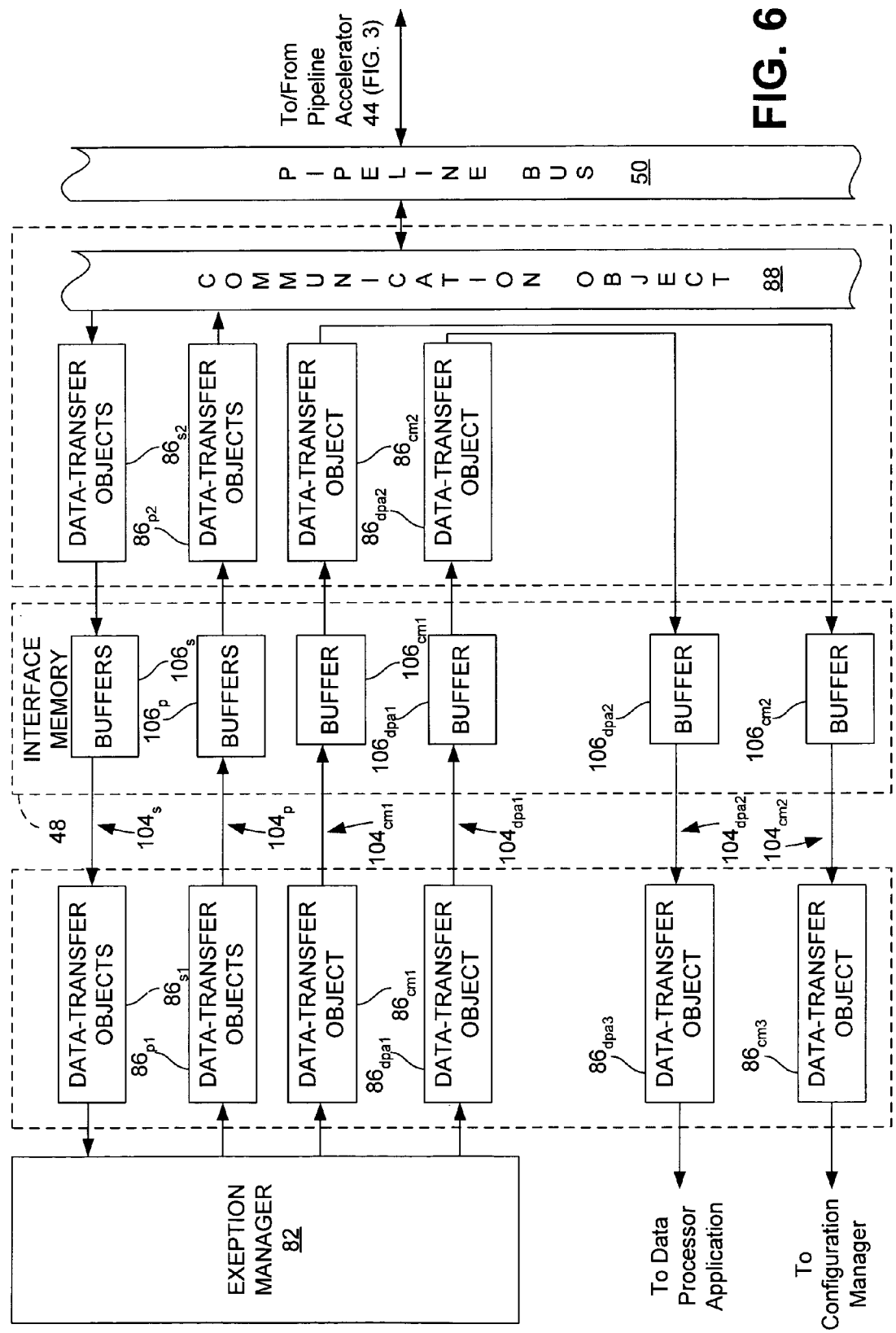
FIG. 6 is a functional block diagram of the data-transfer paths between the accelerator exception manager and the pipeline bus of FIG. 4 according to an embodiment of the invention.

FIG. 6 is a functional block diagram of the exception manager 82, the data-transfer objects 86, and the interface memory 48 according to an embodiment of the invention.

The exception manager 82 receives and logs exceptions that may occur during the initialization or operation of the pipeline accelerator 44 (FIG. 3). Generally, an exception is a designer-defined event where the accelerator 44 acts in an undesired manner. For example, a buffer (not shown) that overflows may be an exception, and thus cause the accelerator 44 to generate an exception message and send it to the exception manager 82. Generation of an exception message is discussed in previously cited U.S. patent application Ser. No. 10/683,929 entitled PIPELINE ACCELERATOR FOR IMPROVED COMPUTING ARCHITECTURE AND RELATED SYSTEM AND METHOD.

The exception manager 82 may also handle exceptions that occur during the initialization or operation of the pipeline accelerator 44 (FIG. 3). For example, if the accelerator 44 includes a buffer (not shown) that overflows, then the exception manager 82 may cause the accelerator to increase the size of the buffer to prevent future overflow. Or, if a section of the accelerator 44 malfunctions, the exception manager 82 may cause another section of the accelerator or the data-processing application 80 to perform the operation that the malfunctioning section was intended to perform. Such exception handling is further discussed below and in previously cited U.S. patent application Ser. No. 10/683,929 entitled PIPELINE ACCELERATOR FOR IMPROVED COMPUTING ARCHITECTURE AND RELATED SYSTEM AND METHOD.

To log and/or handle accelerator exceptions, the exception manager 82 subscribes to data from one or more subscriber threads 100 (FIG. 5) and determines from this data whether an exception has occurred.

In one alternative, the exception manager 82 subscribes to the same data as the subscriber threads 100 (FIG. 5) subscribe to. Specifically, the manager 82 receives this data via the same respective channels $104_s$ (which include, e.g., channel $104_2$ of FIG. 5) from which the subscriber threads 100 (which include, e.g., threads $100_1$ and $100_2$ of FIG. 5) receive the data. Consequently, the channels $104_s$ provide this data to the exception manager 82 in the same manner that they provide this data to the subscriber threads 100.

In another alternative, the exception manager 82 subscribes to data from dedicated channels 106 (not shown), which may receive data from sections of the accelerator 44 (FIG. 3) that do not provide data to the threads 100 via the subscriber channels $104_s$. Where such dedicated channels 104 are used, the object factory 98 (FIG. 4) generates the data-transfer objects 86 for these channels during initialization of the host processor 42 as discussed above in conjunction with FIG. 4. The exception manager 82 may subscribe to the dedicated channels 106 exclusively or in addition to the subscriber channels $104_s$.

To determine whether an exception has occurred, the exception manager 82 compares the data to exception codes stored in a registry (not shown) within the memory 66 (FIG. 3). If the data matches one of the codes, then the exception manager 82 determines that the exception corresponding to the matched code has occurred.

In another alternative, the exception manager 82 analyzes the data to determine if an exception has occurred. For example, the data may represent the result of an operation performed by the accelerator 44. The exception manager 82 determines whether the data contains an error, and, if so, determines that an exception has occurred and the identity of the exception.

After determining that an exception has occurred, the exception manager 82 logs, e.g., the corresponding exception code and the time of occurrence, for later use such as during a debug of the accelerator 44. The exception manager 82 may also determine and convey the identity of the exception to, e.g., the system designer, in a conventional manner.

Alternatively, in addition to logging the exception, the exception manager 82 may implement an appropriate procedure for handling the exception. For example, the exception manager 82 may handle the exception by sending an exception-handling instruction to the accelerator 44, the data-processing application 80, or the configuration manager 84. The exception manager 82 may send the exception-handling instruction to the accelerator 44 either via the same respective channels $104_p$ (e.g., channel $104_1$ of FIG. 5) through which the publisher threads 100 (e.g., thread $100_1$ of FIG. 5) publish data, or through dedicated exception-handling channels 104 (not shown) that operate as described above in conjunction with FIG. 5. If the exception manager 82 sends instructions via other channels 104, then the object factory 98 (FIG. 4) generates the data-transfer objects 86 for these channels during initialization of the host processor 42 as described above in conjunction with FIG. 4. The exception manager 82 may publish exception-handling instructions to the data-processing application 80 and to the configuration manager 84 either directly (as indicated by the dashed lines 85 and 89 in FIG. 4) or via the channels $104_{dpa1}$ and $104_{dpa2}$ (application 80) and channels $104_{cm1}$ and $104_{cm2}$ (configuration manager 84), which the object factory 98 also generates during the initialization of the host processor 42.

Still referring to FIG. 6, as discussed below the exception-handling instructions may cause the accelerator 44, data-processing application 80, or configuration manager 84 to handle the corresponding exception in a variety of ways.

When sent to the accelerator 44, the exception-handling instruction may change the soft configuration or the functioning of the accelerator. For example, as discussed above, if the exception is a buffer overflow, the instruction may change the accelerator's soft configuration (i.e., by changing the contents of a soft configuration register) to increase the size of the buffer. Or, if a section of the accelerator 44 that performs a particular operation is malfunctioning, the instruction may change the accelerator's functioning by causing the accelerator to take the disabled section "off line." In this latter case, the exception manager 82 may, via additional instructions, cause another section of the accelerator 44, or the data-processing application 80, to "take over" the operation from the disabled accelerator section as discussed below. Altering the soft configuration of the accelerator 44 is further discussed in previously cited U.S. patent application Ser. No. 10/683,929 entitled PIPELINE ACCELERATOR FOR IMPROVED COMPUTING ARCHITECTURE AND RELATED SYSTEM AND METHOD.

When sent to the data-processing application 80, the exception-handling instructions may cause the data-processing application to "take over" the operation of a disabled section of the accelerator 44 that has been taken off line. Although the processing unit 62 (FIG. 3) may perform this operation more slowly and less efficiently than the accelerator 44, this may be preferable to not performing the operation at all. This ability to shift the performance of an operation from the accelerator 44 to the processing unit 62 increases the flexibility, reliability, maintainability, and fault-tolerance of the peer-vector machine 40 (FIG. 3).

And when sent to the configuration manager 84, the exception-handling instruction may cause the configuration manager to change the hard configuration of the accelerator 44 so that the accelerator can continue to perform the operation of a malfunctioning section that has been taken off line. For example, if the accelerator 44 has an unused section, then the configuration manager 84 may configure this unused section to perform the operation that was to be the malfunctioning section. If the accelerator 44 has no unused section, then the configuration manager 84 may reconfigure a section of the accelerator that currently performs a first operation to perform a second operation of, i.e., take over for, the malfunctioning section. This technique may be useful where the first operation can be omitted but the second operation cannot, or where the data-processing application 80 is more suited to perform the first operation than it is the second operation. This ability to shift the performance of an operation from one section of the accelerator 44 to another section of the accelerator increases the flexibility, reliability, maintainability, and fault-tolerance of the peer-vector machine 40 (FIG. 3).

Referring to FIG. 7, the configuration manager 84 loads the firmware that defines the hard configuration of the accelerator 44 during initialization of the peer-vector machine 40 (FIG. 3), and, as discussed above in conjunction with FIG. 6, may load firmware that redefines the hard configuration of the accelerator in response to an exception according to an embodiment of the invention. As discussed below, the configuration manager 84 often reduces the complexity of designing and modifying the accelerator 44 and increases the fault-tolerance, reliability, maintainability, and flexibility of the peer-vector machine 40 (FIG. 3).

During initialization of the peer-vector machine 40, the configuration manager 84 receives configuration data from the accelerator configuration registry 70, and loads configuration firmware identified by the configuration data. The configuration data are effectively instructions to the configuration manager 84 for loading the firmware. For example, if a section of the initialized accelerator 44 performs an FFT, then one designs the configuration data so that the firmware loaded by the manager 84 implements an FFT in this section of the accelerator. Consequently, one can modify the hard configuration of the accelerator 44 by merely generating or modifying the configuration data before initialization of the peer-vector machine 40. Because generating and modifying the configuration data is often easier than generating and modifying the firmware directly—particularly if the configuration data can instruct the configuration manager 84 to load existing firmware from a library—the configuration manager 84 typically reduces the complexity of designing and modifying the accelerator 44.

Before the configuration manager 84 loads the firmware identified by the configuration data, the configuration manager determines whether the accelerator 44 can support the configuration defined by the configuration data. For example, if the configuration data instructs the configuration manager 84 to load firmware for a particular PLIC (not shown) of the accelerator 44, then the configuration manager 84 confirms that the PLIC is present before loading the data. If the PLIC is not present, then the configuration manager 84 halts the initialization of the accelerator 44 and notifies an operator that the accelerator does not support the configuration.

After the configuration manager 84 confirms that the accelerator supports the defined configuration, the configuration manager loads the firmware into the accelerator 44, which sets its hard configuration with the firmware, e.g., by loading the firmware into the firmware memory 52. Typically, the configuration manager 84 sends the firmware to the accelerator 44 via one or more channels $104_t$ that are similar in generation, structure, and operation to the channels 104 of FIG. 5. The configuration manager 84 may also receive data from the accelerator 44 via one or more channels $104_u$. For example, the accelerator 44 may send confirmation of the successful setting of its hard configuration to the configuration manager 84.

After the hard configuration of the accelerator 44 is set, the configuration manager 84 may set the accelerator's hard configuration in response to an exception-handling instruction from the exception manager 84 as discussed above in conjunction with FIG. 6. In response to the exception-handling instruction, the configuration manager 84 downloads the appropriate configuration data from the registry 70, loads reconfiguration firmware identified by the configuration data, and sends the firmware to the accelerator 44 via the channels $104_t$. The configuration manager 84 may receive confirmation of successful reconfiguration from the accelerator 44 via the channels $104_u$. As discussed above in conjunction with FIG. 6, the configuration manager 84 may receive the exception-handling instruction directly from the exception manager 82 via the line 89 (FIG. 4) or indirectly via the channels 104$_{cm1}$ and 104$_{cm2}$.

The configuration manager 84 may also reconfigure the data-processing application 80 in response to an exception-handling instruction from the exception manager 84 as discussed above in conjunction with FIG. 6. In response to the exception-handling instruction, the configuration manager 84 instructs the data-processing application 80 to reconfigure itself to perform an operation that, due to malfunction or other reason, the accelerator 44 cannot perform. The configuration manager 84 may so instruct the data-processing application 80 directly via the line 87 (FIG. 4) or indirectly via channels 104$_{dp1}$ and 104$_{dp2}$, and may receive information from the data-processing application, such as confirmation of successful reconfiguration, directly or via another channel 104 (not shown). Alternatively, the exception manager 82 may send an exception-handling instruction to the data-processing 80, which reconfigures itself, thus bypassing the configuration manager 82.

Still referring to FIG. 7, alternate embodiments of the configuration manager 82 are contemplated. For example, the configuration manager 82 may reconfigure the accelerator 44 or the data-processing application 80 for reasons other than the occurrence of an accelerator malfunction.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A peer-vector machine, comprising:
a buffer;
a bus;
a processor coupled to the buffer and to the bus and operable to;
  execute an application, first and second data-transfer objects, and a communication object,
  publish data under the control of the application,
  load the published data into the buffer under the control of the first data-transfer object,
  retrieve the published data from the buffer under the control of the second data-transfer object,
  construct a message under the control of the second data-transfer object, the message including the retrieved published data and information indicating a destination of the retrieved published data, and
  drive the message onto the bus under the control of the communication object; and
a pipeline accelerator coupled to the bus, including the destination, and operable to receive the message from the bus, to recover the received published data from the message, to provide the recovered data to the destination, and to process the recovered data at the destination without executing a program instruction.

2. The peer-vector machine of claim 1 wherein the destination includes a field-programmable gate array that is operable to process the recovered data.

3. The peer-vector machine of claim 1, further comprising:
a registry coupled to the processor and operable to store object data; and
wherein the processor is operable to;
  execute an object factory, and
  generate the first and second data-transfer objects and the communication object from the object data under the control of the object factory.

4. A peer-vector machine, comprising:
a buffer;
a bus;
a pipeline accelerator coupled to the bus and operable to generate data without executing a program instruction, to generate a header including information indicating a destination of the data, to package the data and header into a message, and to drive the message onto the bus; and
a processor coupled to the buffer and to the bus and operable to:
  execute an application, first and second data-transfer objects, and a communication object,
  receive the message from the bus under the control of the communication object,
  load into the buffer, under the control of the first data-transfer object, the received data without the header, the buffer corresponding to the destination of the data,
  unload the data from the buffer under the control of the second data-transfer object, and
  process the unloaded data under the control of the application.

5. The peer-vector machine of claim 4 wherein the processor is operable to:
receive the message from the bus under the control of the communication object; and
recover the data from the message under the control of the first data-transfer object.

6. The peer-vector machine of claim 4, further comprising:
a registry coupled to the processor and operable to store object data; and
wherein the processor is operable to,
  execute an object factory, and
  to generate the first and second data-transfer objects and the communication object from the object data under the control of the object factory.

7. A method, comprising:
publishing data with an application running on a processor;
loading the published data into a buffer with a first data-transfer object running on the processor;
retrieving the published data from the buffer with a second data-transfer object running on the processor;
generating information that indicates a hardwired pipeline for processing the retrieved data;
packaging the retrieved data and the information into a message;
driving the message onto a bus with a communication object running on the processor;
receiving the message from the bus; and
processing the published data with the indicated hardwired pipeline without executing a program instruction, the indicated hardwired pipeline being part of a pipeline accelerator that includes a field-programmable gate array.

8. The method of claim 7 wherein:
packaging the retrieved data and the information into a message comprises generating the message including a header, and the published data, with the second data-transfer object;
driving the data onto the bus comprises driving the message onto the bus with the communication object; and
receiving the published data comprises receiving the message and recovering the published data from the message with the pipeline accelerator.

9. A method, comprising:
generating, with a pipeline accelerator and without executing a program instruction, a message header that includes a destination of data, the destination identifying a software application for processing the data;
generating, with the pipeline accelerator and without executing a program instruction, a message that includes the header and the data;
driving the message onto a bus with the pipeline accelerator;
receiving the message from the bus with a communication object running on a processor;
loading into a buffer, with a first data-transfer object running on the processor, the received data absent the header, the buffer being identified by the destination;
unloading the data from the buffer with a second data-transfer object running on the processor; and
processing the unloaded data with the software application running on the processor.

10. The method of claim 9, further comprising recovering the data from the message with the first data-transfer object.

11. A peer-vector machine, comprising:
a buffer;
a single bus coupled between a processor and a pipeline accelerator;
wherein the processor is coupled to the buffer and is operable to:
execute an application, first and second data-transfer objects, and a communication object,
publish data under the control of the application,
load the published data into the buffer under the control of the first data-transfer object,
retrieve the published data from the buffer under the control of the second data-transfer object,
construct a message under the control of the second data-transfer object, the message including the retrieved published data and information indicating a destination of the retrieved published data, and
drive the message onto the bus under the control of the communication object; and
wherein the pipeline accelerator includes the destination and is operable to receive the message from the bus, to recover the received published data from the message, to provide the recovered data to the destination, and to process the recovered data at the destination without executing a program instruction.

* * * * *